(12) United States Patent
Yurko et al.

(10) Patent No.: US 6,712,417 B2
(45) Date of Patent: Mar. 30, 2004

(54) TACTICAL ID VISOR

(76) Inventors: Richard Yurko, 3609 S St., NW., Washington, DC (US) 20007; Eric R. Haapapuro, 2300 41st St., NW., Washington, DC (US) 20007

( * ) Notice: Subject to any disclaimer, the term of this patent is extended or adjusted under 35 U.S.C. 154(b) by 0 days.

(21) Appl. No.: 10/191,324

(22) Filed: Jul. 10, 2002

(65) Prior Publication Data

US 2003/0015887 A1 Jan. 23, 2003

Related U.S. Application Data

(60) Provisional application No. 60/303,770, filed on Jul. 10, 2001.

(51) Int. Cl.$^7$ .................................................. B60J 3/00
(52) U.S. Cl. ........................ 296/97.8; 296/97.5; 224/312
(58) Field of Search .............................. 296/97.8, 97.5, 296/97.6, 97.1; 224/312, 572, 277

(56) References Cited

U.S. PATENT DOCUMENTS

| | | | |
|---|---|---|---|
| 2,048,105 A | | 7/1936 | Cobbs |
| 2,089,596 A | * | 8/1937 | Buhr ............................ 40/627 |
| 2,531,295 A | | 11/1950 | Ritchie |
| 2,637,128 A | * | 5/1953 | Weeks ........................ 224/312 |
| 4,055,012 A | | 10/1977 | Cote |
| D248,847 S | | 8/1978 | Wooters |
| 4,391,053 A | * | 7/1983 | Anthony ..................... 296/97.5 |
| D273,002 S | | 3/1984 | Schafer |
| D286,894 S | | 11/1986 | Haas et al. |
| 4,710,856 A | * | 12/1987 | Cheung ........................ 29/97.5 |
| 4,781,409 A | * | 11/1988 | Harbison .................... 296/97.8 |
| 4,844,311 A | | 7/1989 | Kalen |
| 5,067,764 A | | 11/1991 | Lanser et al. |
| D325,554 S | | 4/1992 | Min-Jenn |
| 5,195,668 A | * | 3/1993 | Kunes et al. ............... 296/97.5 |
| 5,274,532 A | | 12/1993 | Gabas |
| 5,301,856 A | * | 4/1994 | Newsome .................... 296/97.5 |
| 5,379,929 A | * | 1/1995 | Eskandry .................... 296/97.5 |
| 5,430,965 A | * | 7/1995 | Lai .............................. 40/597 |
| 5,533,776 A | * | 7/1996 | Agro et al. .................. 296/97.5 |
| 5,538,311 A | * | 7/1996 | Fusco et al. ................. 296/97.5 |
| 5,577,791 A | * | 11/1996 | Viertel et al. ............... 296/97.5 |
| 5,613,725 A | | 3/1997 | Lozano |
| D392,235 S | | 3/1998 | Steinhagen et al. |
| 5,765,898 A | | 6/1998 | Crotty, III |
| 5,772,272 A | * | 6/1998 | Faddis ........................ 296/97.5 |
| 5,871,251 A | * | 2/1999 | Welling et al. ............. 296/97.5 |
| 5,887,773 A | | 3/1999 | Booth |
| 5,927,792 A | * | 7/1999 | Welling et al. ............. 296/97.5 |
| 5,947,545 A | * | 9/1999 | Akagi et al. ................ 296/97.5 |
| 5,971,468 A | * | 10/1999 | King .......................... 296/97.5 |
| 5,975,708 A | * | 11/1999 | Fitzpatrick et al. ........ 296/97.5 |
| 6,347,824 B1 | * | 2/2002 | Akouri et al. .............. 296/97.5 |

* cited by examiner

Primary Examiner—Stephen T. Gordon
Assistant Examiner—Lori L Coletta
(74) Attorney, Agent, or Firm—Mattingly, Stanger & Malur, P.C.

(57) ABSTRACT

The tactical ID visor and visor attachment enables individuals, particularly law enforcement personnel to review items held thereon while maintaining a line of sight to a suspect/location. The visor attachment can be made of transparent plastic having clips for holding ID's, vehicle registrations, etc. Lights are provided so that items can be read without interfering with the line of sight of law enforcement personnel. According to another embodiment, the visor can be redesigned to incorporate a lighted portion which would hold the necessary items and still enable law enforcement personnel to obtain information while maintaining their line of sight.

21 Claims, 2 Drawing Sheets

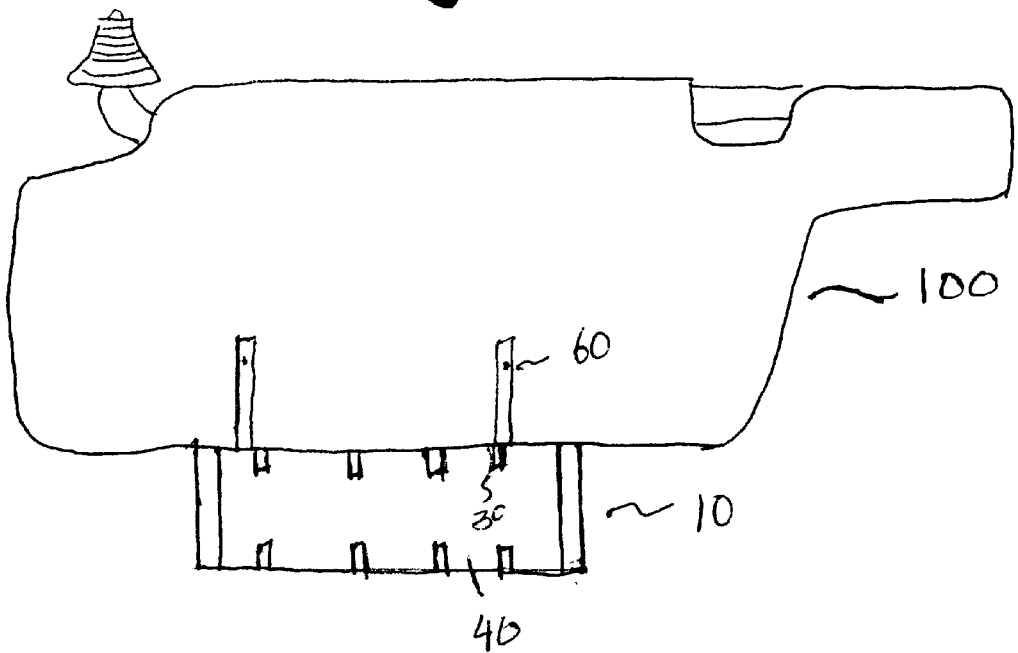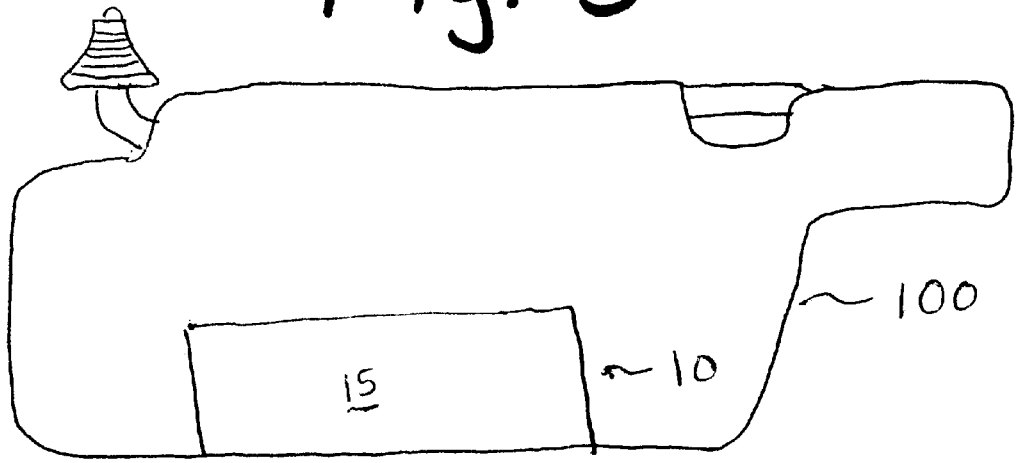

TACTICAL ID VISOR

This application claims the benefit of provisional application 60/303,770 filed on Jul. 10, 2001.

FIELD OF THE INVENTION

This invention relates to visors and visor attachments for vehicles. More particularly, this invention relates to a visor attachment which permits items, such as driver's licenses, etc., to be held and easily read without interfering with an individual's ability to see through the front or side windshield of the vehicle.

BACKGROUND OF THE INVENTION

Automobile visors and visor attachments are generally known in the prior art. Various different types include U.S. Pat. Nos. 5,538,311; 5,067,764; 5,379,929; 5,887,773; Des. 273,002; Des. 286,894; Des. 325,554; Des. 248,847; 5,301,856; 5,274,532; 5,613,725; 5,577,791; 2,048,105; 2,531,295; 5,947,545; 5,765,898; 4,844,311; 4,055,012; 2,637,128 and Des. 392,235. The entire disclosures of all of these patents are hereby incorporated by reference.

SUMMARY OF THE INVENTION

While it is known in the prior art to provide various types of automobile visors and visor attachments, it is not known in the prior art how to provide a visor or visor attachment in which items held thereon can be easily read without interfering with an individuals ability to properly see through the windshield of the automobile.

Accordingly, it is an object of the present invention to enable an individual, particularly law enforcement personnel, to affix ID's, vehicle registrations and other related documents in an area while maintaining a line of sight through the front windshield of the automobile, or other vehicle, toward a suspect vehicle/location. If the visor was turned facing the side windshield of the automobile, the same would hold true for the line of sight through the side windshield.

Another object of the present invention is to enable law enforcement personnel to write citations and perform other related functions with easy access to written information on a suspect's documents while enabling personnel to always keep the suspect in view.

Preferably, the visor or visor attachments are equipped with lights for nighttime use that do not interfere substantially with the ability to see the suspect vehicle/location. According to a preferred embodiment, red lights are employed. In addition, the visor or visor attachments hold multiple forms of IDs and documents for incidents ranging from traffic stops and accidents to critical lookouts.

These and other objects features and advantages of the present invention will become more apparent in light of the detailed description of the preferred embodiments in connection with the Drawings.

DETAILED DESCRIPTION OF THE PREFERRED EMBODIMENTS

The tactical visor attachment will provide law enforcement personnel a platform upon which to place drivers license, registration, insurance, identification and other pertinent documents within easy view during traffic stops. The attachment's placement on an auto's built-in sun visor allows the officer to keep the vehicle and its occupants in view while writing citations or making other incident documentation—a critical point in maintaining officer safety.

Figure 1:
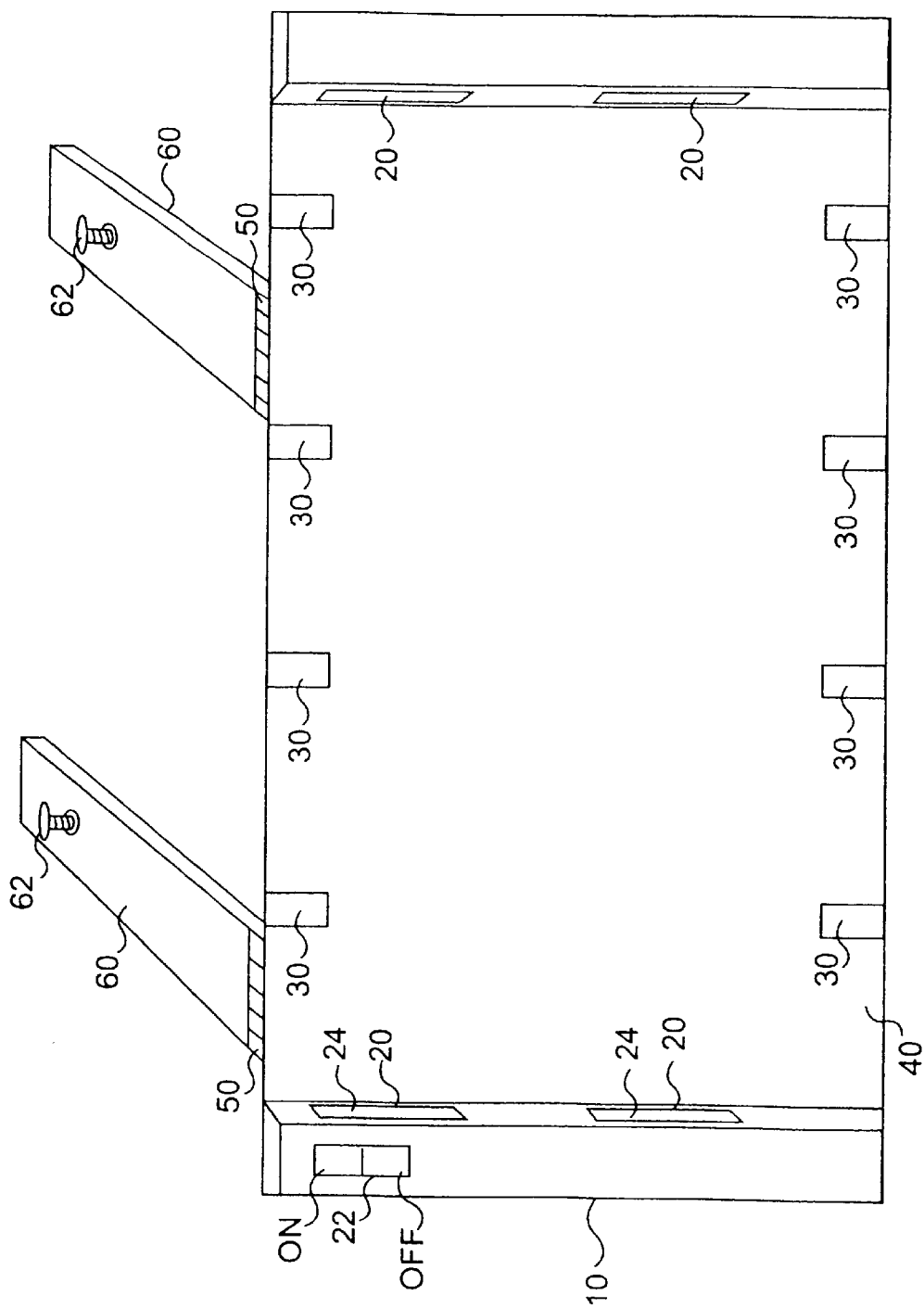
FIG. 1 illustrates a visor attachment according to an embodiment of the present invention.

According to an embodiment of the present invention as shown in FIG. 1, the visor attachment 10 is made from lightweight plastic easily adapted to fit standard sun visors in nearly any vehicle. The visor attachment can be used by both occupants of the police cruiser (driver or passenger).

The lighting instruments are preferably built-in red lights 20 provide the safety of viewing without "backlighting" or disturbing an officer's eyes natural adjustment to low light conditions. The light emanating from lights 20 preferably originates from both ends of the visor attachment 10 and is directed at the documents supported by clips 30 on a main body 40, rather than back at the officer. In this regard, the lights have lenses 24 through which light emanates. According to the embodiment shown, the surface of each of the lenses is approximately perpendicular to the surface of the main body 40. If desired, some variations could be introduced with respect to the direction at which the lights point as long as the do not interfere with the individual's line of sight. Preferably, the surface of the lenses defines an angle with respect to the surface of the main body that is less than or equal to 90 degrees. The main body 40 is preferably made from transparent plastic. This design feature again keeps the light away from the officer's eyes and maintains that critical low-light vision focus. The lights are preferably battery powered, thus negating the need for cumbersome and distracting power cords. However, alternate power sources can be used. The light switch 22 is preferably a simple on/off toggle switch for fast and simple operation.

The hinges 50 allow the tactical visor attachment to be used when the sun visor is in any position, depending on the time of day. This feature also allows for eye-level comfort adjustment for law enforcement personnel of varying heights. The visor attachment rotates a full 180 degrees for optimum mobility. If desired, the attachment could be constructed to rotate almost 360 degrees. The visor attachment can be affixed to either side of the visor.

The clips 30 holding documentation should be transparent, so no piece of information will be obscured by the clips 30 themselves. Once the document has been secured in place, the law enforcement individual will not need to re-adjust its placement until the traffic stop/incident is concluded.

Strong clips 60 and adjustable thumbscrews 62 can be used to fasten the attachment to the sun visor securely so the attachment 10 will not fall loose during high speed pursuits or rough vehicle handling. Additionally, the clips and thumbscrews allow the attachment 10 to fit a variety of sun visors of different sizes and thicknesses. Of course, the visor attachment 10 could be attached in various other ways well known in the prior art.

The attachment 10 can also be constructed to be easily installed and removed for use in multiple vehicles, which would prove advantageous in those jurisdictions without "take home" or assigned cruisers. It can also be small enough to store in a duty bag.

Figure 2:
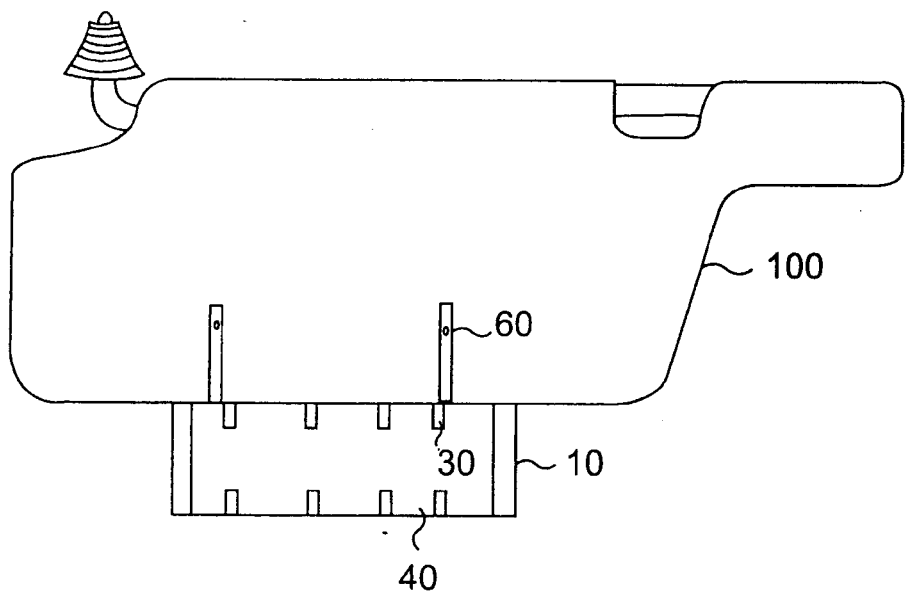
FIG. 2 illustrates a visor having the visor attachment fixed thereto.
Figure 3:
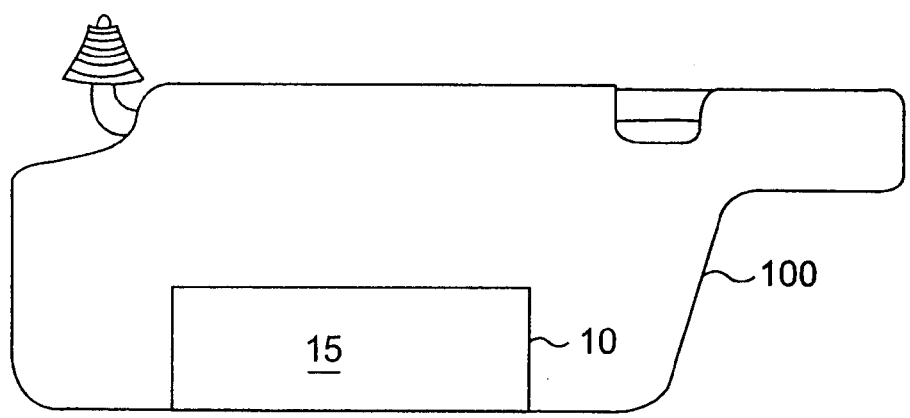
FIG. 3 illustrates a visor incorporating the visor attachment of FIG. 1 as a single unit according to an embodiment of the present invention.

FIG. 2 illustrates a visor 100 with the visor attachment 10 of FIG. 1. FIG. 3 illustrates another embodiment in which the visor itself is modified to incorporate a portion to handle documents, licenses, etc., while still enabling a clear line of sight. The built in portion would preferably be transparent like the visor attachment 10 of FIG. 1 with a cover 15 that is moved out of the way when in use, or could be non-transparent. Lights should still be provided to enable viewing of the items held therein without interfering with an individual's eyes. This can be accomplished by providing lights in the manner described above and shown in FIG. 1.

While the present invention has been described above in conjunction with the preferred embodiment disclosed above and illustrated in the attached figure, one of ordinary skill in the art would be enabled by this disclosure to make various modifications to the preferred embodiments and still be within the scope and spirit of the present invention as defined in the appended claims.

What is claimed is:

1. A visor attachment which is to be attached to a visor of a vehicle comprising:
    a transparent main body having a surface onto which items to be viewed are positioned; and
    lighting instruments which impinge light upon the surface of the transparent main body so as to enable the items positioned thereon to be viewed,
    wherein, because the main body is transparent, an individual can maintain a line of sight through the visor attachment to objects in front of the vehicle while viewing items positioned on the visor attachment.

2. A visor attachment which is to be attached to a visor of a vehicle comprising:
    a transparent main body having a surface onto which items to be viewed are positioned; and
    lighting instruments which impinge light upon the surface of the transparent main body so as to enable the items positioned thereon to be viewed; and
    further comprising clips for holding items to be viewed.

3. The visor attachment of claim 1, wherein the lighting instruments have lenses through which light emits, the lenses have a surface that defines an angle with respect to the surface of the transparent main body that is no more than 90 degrees.

4. A visor attachment which is to be attached to a visor of a vehicle comprising:
    a transparent main body having a surface onto which items to be viewed are positioned; and
    lighting means for impinging light upon the surface of the transparent main body so as to enable the items positioned thereon to be viewed,
    wherein, because the main body is transparent, an individual can maintain a line of sight through the visor attachment to objects in front of the vehicle while viewing items positioned on the visor attachment.

5. A visor attachment which is to be attached to a visor of a vehicle comprising:
    a transparent main body having a surface onto which items to be viewed are positioned; and
    lighting means for impinging light upon the surface of the transparent main body so as to enable the items positioned thereon to be viewed; and
    further comprising clips for holding items to be viewed.

6. The visor attachment of claim 4, wherein the lighting means includes lenses through which light emits, the lenses having a surface that defines an angle with respect to the surface of the transparent main body that is no more than 90 degrees.

7. A visor of a vehicle comprising a visor body, the visor body having a built-in portion comprising:
    a transparent main body having a surface onto which items to be viewed are positioned; and
    lighting instruments which impinge light upon the surface of the transparent main body so as to enable the items positioned thereon to be viewed.

8. The visor of claim 7, further comprising clips for holding items to be viewed.

9. The visor of claim 7, wherein the lighting instruments have lenses through which light emits, the lenses have a surface that defines an angle with respect to the surface of the transparent main body that is no more than 90 degrees.

10. A visor attachment which is to be attached to a visor of a vehicle comprising:
    a transparent main body having a surface onto which items to be viewed are positioned; and
    lighting instruments which impinge light upon the surface of the transparent main body so as to enable the items positioned thereon to be viewed,
    wherein, when the visor attachment is in use, the visor attachment is positioned such that a lowermost portion of the visor attachment is lower than a lowermost portion of the visor.

11. The visor attachment according to claim 10, wherein, because the main body is transparent, an individual can maintain a line of sight through the visor attachment to objects in front of the vehicle while viewing items positioned on the visor attachment.

12. The visor attachment according to claim 11, further comprising clips for holding items to be viewed.

13. The visor attachment according to claim 12, wherein the clips are transparent.

14. The visor attachment according to claim 11, wherein the lighting means are positioned so that, upon illumination, the items can be viewed without substantially interfering with the line of sight from the individual to the objects in front of the vehicle.

15. The visor according to claim 7, wherein because the main body of the built-in portion is transparent, an individual can maintain a line of sight through the visor to objects in front of the vehicle while viewing items positioned on the main body.

16. The visor according to claim 7, further comprising clips for holding items to be viewed.

17. The visor according to claim 16, wherein the clips are transparent.

18. The visor according to claim 15, wherein the lighting means are positioned so that the items can be viewed without substantially interfering with the line of sight from the individual to the objects in front of the vehicle.

19. A visor attachment which is to be attached to a visor of a vehicle comprising:
    a transparent main body having a surface onto which items to be viewed are positioned; and
    holding means for holding items that are to be viewed on the transparent main body,
    wherein, when the visor attachment is in use, a lowermost portion of the transparent main body is lower than a lowermost portion of the visor, and
    wherein, because the main body is transparent, an individual can maintain a line of sight through the visor attachment, when it is in use, to objects in front of the vehicle.

20. The visor attachment according to claim 19, wherein the holding means includes clips.

21. The visor attachment according to claim 20, wherein the clips are transparent.

* * * * *

UNITED STATES PATENT AND TRADEMARK OFFICE
CERTIFICATE OF CORRECTION

PATENT NO.    : 6,712,417 B2
DATED         : March 30, 2004
INVENTOR(S)   : R. Yurko et al.

It is certified that error appears in the above-identified patent and that said Letters Patent is hereby corrected as shown below:

Drawings,
Please insert the attached formal drawings Figs. 2 and 3.

Signed and Sealed this

Twenty-seventh Day of July, 2004

JON W. DUDAS
*Acting Director of the United States Patent and Trademark Office*